(12) United States Patent
Jones

(10) Patent No.: US 12,478,944 B2
(45) Date of Patent: Nov. 25, 2025

(54) METAL SULFIDES ON ALKALI EARTH PARTICLE SUBSTRATES

(71) Applicant: Atlas Carbon, LLC, New Orleans, LA (US)

(72) Inventor: Michael A. Jones, Gillette, WY (US)

(73) Assignee: Atlas Carbon, LLC, New Orleans, LA (US)

(*) Notice: Subject to any disclaimer, the term of this patent is extended or adjusted under 35 U.S.C. 154(b) by 1130 days.

(21) Appl. No.: 17/358,690

(22) Filed: Jun. 25, 2021

(65) Prior Publication Data

US 2021/0402366 A1 Dec. 30, 2021

Related U.S. Application Data

(60) Provisional application No. 63/044,239, filed on Jun. 25, 2020.

(51) Int. Cl.
| | |
|---|---|
| *B01J 20/04* | (2006.01) |
| *B01D 53/64* | (2006.01) |
| *B01D 53/81* | (2006.01) |
| *B01J 20/02* | (2006.01) |
| *B01J 20/28* | (2006.01) |
| *B01J 20/32* | (2006.01) |

(52) U.S. Cl.
CPC ............ *B01J 20/041* (2013.01); *B01D 53/64* (2013.01); *B01D 53/81* (2013.01); *B01J 20/0237* (2013.01); *B01J 20/0266* (2013.01); *B01J 20/28021* (2013.01); *B01J 20/3204* (2013.01); *B01J 20/3214* (2013.01); *B01J 20/3234* (2013.01); *B01J 20/3293* (2013.01); *B01D 2251/404* (2013.01); *B01D 2251/604* (2013.01); *B01D 2257/602* (2013.01)

(58) Field of Classification Search
CPC ..................................................... B01J 20/041
See application file for complete search history.

(56) References Cited

U.S. PATENT DOCUMENTS

| | | | |
|---|---|---|---|
| 3,873,581 | A | 3/1975 | Fitzpatrick et al. |
| 4,094,777 | A | 6/1978 | Sugier et al. |
| 4,474,896 | A | 10/1984 | Chao |
| 4,500,327 | A | 2/1985 | Nishino et al. |
| 6,524,371 | B2 | 2/2003 | El-Shoubary et al. |
| 10,471,385 | B2 | 11/2019 | Gale |
| 2004/0144250 | A1 | 7/2004 | Neuroth et al. |

FOREIGN PATENT DOCUMENTS

WO 2016184518 A1 11/2016

*Primary Examiner* — Peter F Godenschwager
(74) *Attorney, Agent, or Firm* — Patterson + Sheridan, LLP

(57) ABSTRACT

The present disclosure relates to methods for producing metal sulfide disposed on particle substrates. In at least one embodiment, a method for producing an alkali earth hydroxide particle having a metal sulfide disposed thereon includes introducing an alkali earth oxide particle with a metal sulfate to form a first composition. The method includes introducing an alkali sulfide or an alkali earth sulfide with the first composition to form a second composition. The present disclosure further relates to compositions of matter having metal sulfide disposed on a particle substrate. In at least one embodiment, a composition of matter includes an alkali earth hydroxide particle. The composition of matter includes a metal sulfide disposed on the alkali earth hydroxide particle.

5 Claims, 2 Drawing Sheets

METAL SULFIDES ON ALKALI EARTH PARTICLE SUBSTRATES

CROSS-REFERENCE TO RELATED APPLICATIONS

This patent application claims priority to and the benefit of U.S. Provisional Patent Application No. 63/044,239, filed Jun. 25, 2020. The above referenced patent application is herein incorporated by reference in its entirety.

FIELD

The present disclosure relates to methods for producing metal sulfides disposed on particle substrates. The present disclosure further relates to compositions of matter having metal sulfide disposed on an alkali earth particle substrate.

BACKGROUND

Advances in mercury capture have led to the development of numerous adsorbents and reagents capable of capturing mercury species in industrial process flue gases and waste streams. In cement plants, coal fired power plants, and municipal waste incinerators, mercury capture is of particular interest. Prior approaches to mercury capture have shown that powdered halogenated activated carbons can be effective. Halogens, such as bromides and iodides, have also been successfully introduced into boilers separate from the activated carbons with a wide degree of success. However, the current use of carbon-based adsorbents for capturing mercury species can adversely affect the potential sale of fly ash products because fly ash products are used to form cement and the presence of remaining carbon content in the fly ash inhibits cement properties. In addition, halogens such as bromide and iodide have been shown to corrode components of a flue gas processing system (such as a duct of the system), which in turn raises the overall cost of mercury compliance. Accordingly, inorganic sorbents capable of mercury adsorption (without affecting fly ash quality) have been pursued. However, inorganic adsorbents such as hydrated lime have been shown to not be effective for mercury adsorption, falling short of the goals set by the Environmental Protection Agency. In fact, contact of hydrated lime with flue gases has been shown to reduce ionic mercury into elemental mercury, thereby yielding a loss of efficiency in mercury removal since ionic mercury is the species that reacts with sulfur compounds present in the flue gas duct. In addition, inorganic adsorbents such as calcium-magnesium compounds can be utilized to form adsorbents, but the synthesis of such adsorbents includes use of metal ammonia compounds formed from metal halides, yielding substantial halogen content in the adsorbent product.

Silica-based adsorbents have also been proposed. However, the synthesis of silica-based adsorbents involves adjustments of pH and use of additional chemicals (such as ammonia, acetic acid, and hygroscopic additives). In addition, coal-fired combustion flue gas streams include trace amounts of acid gases, such as $SO_2$, $NO$, $NO_2$, and $HCl$, which have been shown to adversely impact the performance of adsorbents, such as chemically treated activated carbons and noble-metal impregnated alumina.

There is a need for more effective adsorbents having lower corrosion potentials and lower overall cost of mercury compliance, as compared to conventional adsorbents. For example, halogen-free adsorbents with high effectiveness per pound of product are of particular interest.

BRIEF SUMMARY

In at least one embodiment, a method produces an alkali earth hydroxide particle having a metal sulfide disposed thereon. The method includes introducing an alkali earth oxide particle with a metal sulfate to form a first composition. The method includes introducing an alkali sulfide or an alkali earth sulfide and $H_2O$ with the first composition to form a second composition.

In at least one embodiment, a composition of matter includes an alkali earth hydroxide particle. The composition of matter includes a metal sulfide disposed on the alkali earth hydroxide particle.

In at least one embodiment, a method for producing an alkali earth hydroxide particle and disposing a metal sulfide simultaneously thereon includes introducing an alkali sulfide or an alkali earth sulfide with a metal sulfate and $H_2O$ to form a first composition. The method includes introducing an alkali earth oxide particle with the first composition to form a second composition.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
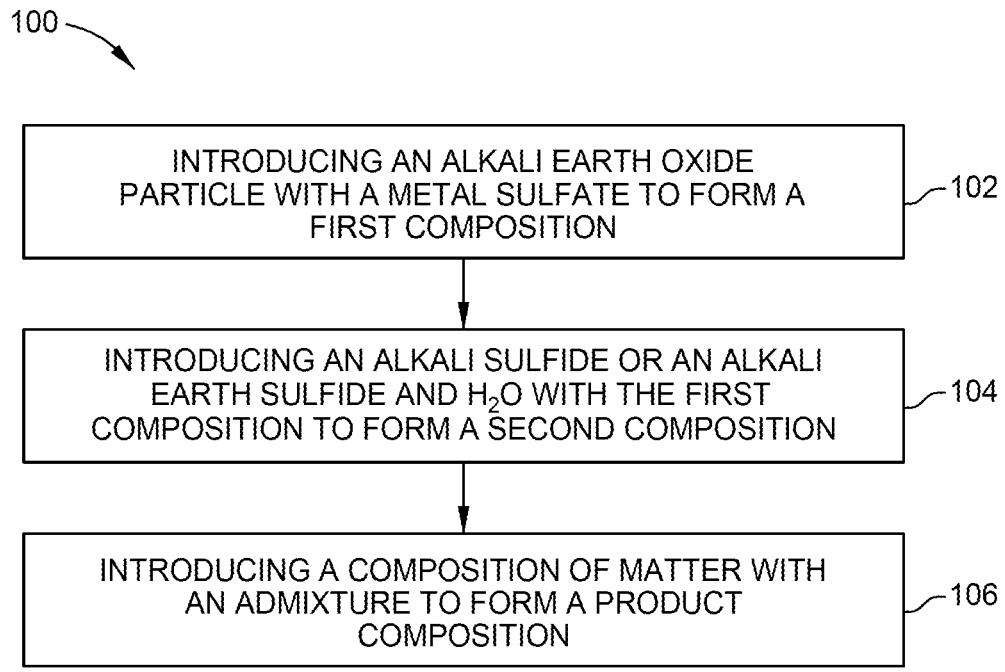
FIG. 1 is a flow diagram illustrating a method for producing a composition of matter, according to an embodiment.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

Methods and compositions of matter (and compositions thereof) have been developed that have resulted in substantial improvements over conventional adsorbents and conventional methods of making adsorbents. Methods and compositions of matter of the present disclosure utilize metal sulfides disposed on solid non-silicate-based substrates. Alkali sulfide and/or alkali earth sulfide may also be disposed on the solid non-silicate-based substrates. Methods of making the compositions of matter provide a substrate having a precipitated metal sulfide disposed thereon, and the composition of matter does not need heat provided for the chemical reactions to occur and does not need a drying step after the composition of matter has been formed. Notwithstanding, a limited amount of external heat can be added in some embodiments to enhance reactions and drying conditions when making the composition of matter. Such optional auxiliary heat inputs would only represent a minority of the total heat balance available. Compositions of matter of the present disclosure can also have a high exposed surface area (provided by the unique reaction conditions to produce the compositions of matter) which provide enhanced mercury capture as compared to conventional adsorbents. Compositions of matter of the present disclosure provide effective adsorbents having lower corrosion potentials and lower overall cost of mercury compliance, as compared to conventional adsorbents. For example, compositions of matter of the present disclosure can be halogen-free adsorbents with high effectiveness per pound of product are of particular interest.

Methods and compositions of matter of the present disclosure utilize various metal sulfides, alkali sulfides, and/or alkali earth sulfides and when cited may refer to various hydrated forms and/or anhydrous forms. It is understood that, unless expressly stated, the method and composition of matter of the present disclosure contemplates the use and incorporation of the various forms of metal sulfides, alkali sulfides and/or alkali earth sulfides.

In some embodiments, one or more admixture materials (e.g., filler materials or adsorbents) can be added to a composition of matter of the present disclosure (to form a product composition) for additional benefits in the removal of oxidized mercury species and/or the reduction of $SO_2$/$SO_3$ during use. Calcium hydroxide substrates can reduce $SO_2$/$SO_3$ species and improve mercury capture performance. Sodium bicarbonate admixture material can reduce $SO_2$/$SO_3$ species and improve mercury capture performance. Some admixture materials can provide additional thermal stability to the composition of matter during shipping, storage, and use.

As used herein, a "composition of matter" refers to a particle substrate having a metal sulfide disposed thereon. A composition of matter can include the components of the composition of matter (e.g., the particle support and the metal sulfide) and/or reaction product(s) of two or more components of the composition of matter.

As used herein, "disposed on" or "disposed thereon" refers to a material that has been coated, hosted, or impregnated onto and/or into another material.

As used herein, a "product composition" refers to a combination (e.g., dispersion, mixture, formulation, etc.) of a composition of matter of the present disclosure and an admixture material (e.g., adsorbent). A product composition can include the components of the product composition (e.g., the composition of matter and the admixture material) and/or reaction product(s) of two or more components of the product composition.

Methods for Making Compositions of Matter

The present disclosure provides methods of reacting a metal sulfate with an alkali sulfide or alkali earth sulfide compound to create a metal sulfide and concurrently or subsequently further reacting on an alkali earth oxide substrate to create a highly reactive, high exposed surface area sulfide-containing alkali earth hydroxide particle that can be used, for example, as an adsorbent for mercury capture.

FIG. 1 is a flow diagram illustrating a method 100 for producing a composition of matter (a metal sulfide disposed on an alkali earth hydroxide particle substrate), according to at least one embodiment. Method 100 includes introducing 102 an alkali earth oxide particle with a metal sulfate to form a first composition. Method 100 includes introducing 104 an alkali sulfide or an alkali earth sulfide with the first composition to form a second composition and thereby upon reacting creating a metal sulfide disposed on an alkali earth hydroxide particle. Method 100 of FIG. 1 can be performed by further introducing $H_2O$ with the first composition and/or second composition.

Reactions occurring provide that the second composition facilitates the disposing of the metal sulfide on the alkali earth hydroxide particle regardless of whether reactant components in any chosen method are partially mingled, disposed, or reacted in the first composition.

Figure 2:
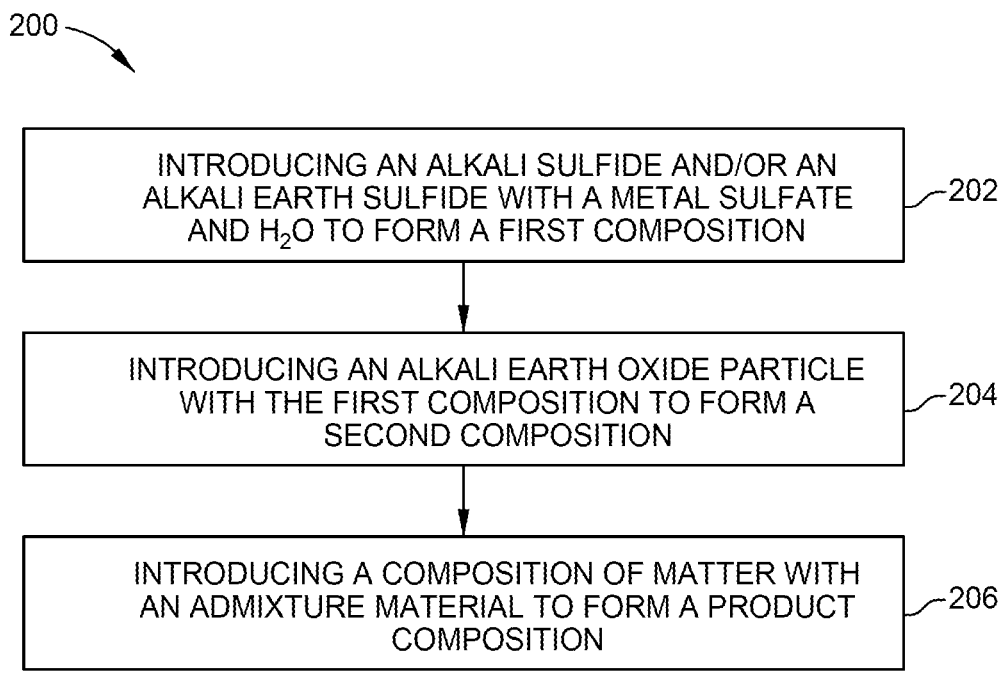
FIG. 2 is a flow diagram illustrating a method for producing a composition of matter, according to an embodiment.

In additional or alternative embodiments, a method includes introducing an alkali sulfide or an alkali earth sulfide with a metal sulfate and $H_2O$ to form a first composition. The method includes introducing an alkali earth oxide particle with the first composition to form a second composition. FIG. 2 is a flow diagram illustrating a method 200 for producing a composition of matter (a metal sulfide disposed on an alkali earth hydroxide particle substrate), according to at least one embodiment. Method 200 includes introducing 202 an alkali sulfide (particle or solution) and/or an alkali earth sulfide (particle or solution) with a metal sulfate (particle or solution) to form a first composition. Introducing can include comingling (e.g., mixing, blending, dispersing) an alkali sulfide and/or alkali earth sulfide with a metal sulfate optionally with elemental sulfur to create a substantially homogeneous first composition. The alkali sulfide, alkali earth sulfide, metal sulfate, and/or elemental sulfur can be in powder form or be in the presence of a diluent (e.g., $H_2O$) upon the introducing 202. The first composition can be comingled for about 1 minute or greater, such as about 5 minutes to about 60 minutes. Method 200 includes introducing 204 an alkali earth oxide (particle or solution having ambient temperature or elevated temperature) with the first composition to form a second composition. In some embodiments, an alkali earth oxide particle is introduced with a metal sulfide slurry or paste (of the first composition). Alternatively, introducing 204 includes introducing a pre-formed alkali earth hydroxide (particle or solution having ambient temperature or elevated temperature) with the first composition to form a second composition. The pre-formed alkali earth hydroxide can be added in addition to or instead of the alkali earth oxide. Method 200 of FIG. 2 can be performed by further introducing $H_2O$ with the first composition and/or second composition.

Figure 3:
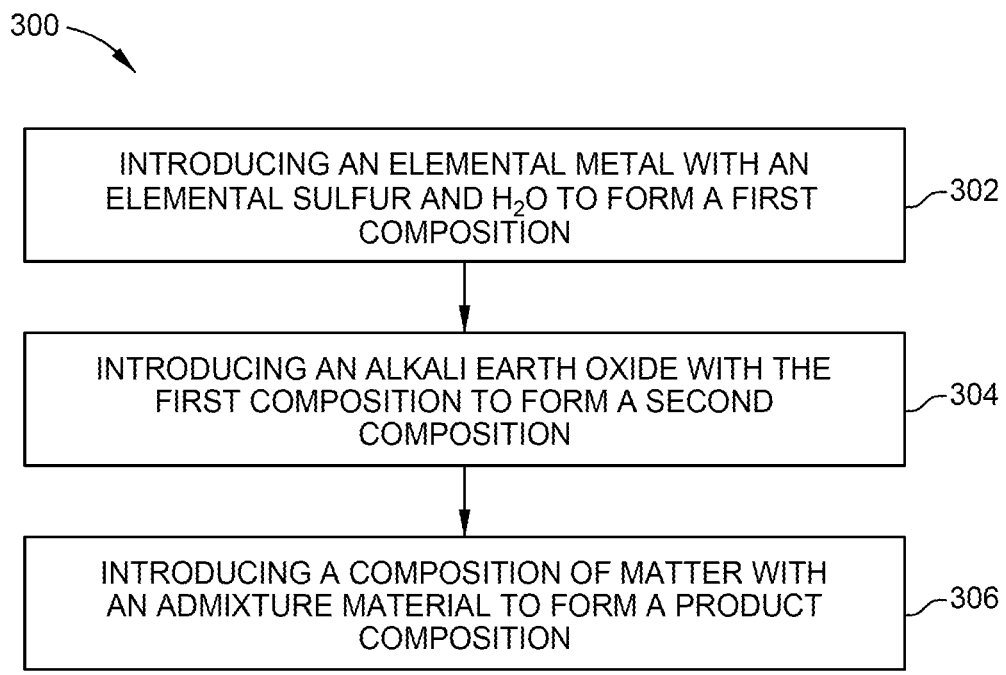
FIG. 3 is a flow diagram illustrating a method for producing a composition of matter, according to an embodiment.

In additional or alternative embodiments, an elemental metal is used instead of a metal sulfate. For example, methods for producing an alkali earth substrate having a metal sulfide disposed thereon include introducing an alkali earth oxide particle or alkali earth hydroxide particle with an elemental metal and elemental sulfur to form a first composition. The elemental metal and elemental sulfur can be reacted at elevated temperatures to form a dispersed metal sulfide (and a polysulfide) on the hydrated alkali earth oxide particle. Energy required for the elemental metal and elemental sulfur reactions can be supplied chemically via hydration of the alkali earth oxide substrate and/or by heating or preheating components of the first composition and/or by heating the first composition. An elemental metal may include copper, manganese, iron, cobalt, nickel, zinc, or combination(s) thereof. FIG. 3 is a flow diagram illustrating a method 300 for producing a composition of matter (a metal sulfide disposed on an alkali earth hydroxide particle substrate), according to at least one embodiment. Method 300 includes introducing 302 an elemental metal (particle or solution) with an elemental sulfur to form a first composition. Introducing can include comingling (e.g., mixing, blending, dispersing) an elemental metal with an elemental sulfur to create a substantially homogeneous first composition. The elemental metal and elemental sulfur can be in powder form or be in the presence of a diluent (e.g., $H_2O$) upon the introducing 302. The first composition can be comingled for about 1 minute or more, such as about 5 minutes to about 60 minutes. Method 300 includes introducing 304 an alkali earth oxide (particle or solution) with the first composition to form a second composition. Method 300 of FIG. 3 can be performed by further introducing $H_2O$ with the first composition and/or second composition.

Returning to method 100, method 100 includes introducing 102 an alkali earth oxide particle with a metal sulfate to form a first composition. Introducing can include comingling (e.g., mixing, blending, dispersing) an alkali earth oxide particle with a metal sulfate optionally with elemental sulfur to create a substantially homogeneous first composition. The alkali earth oxide particle, metal sulfate, and/or elemental sulfur can be in powder form or be in the presence of a diluent (e.g., $H_2O$) upon the introducing 102. The first composition can be comingled for about 1 minute or more, such as about 5 minutes to about 60 minutes before introducing alkali sulfide or alkali earth sulfide with the first composition.

An alkali earth oxide particle (e.g., of methods 100, 200, or 300) can include magnesium oxide (MgO), calcium oxide (CaO), barium oxide (BaO), or combination(s) thereof. In at least one embodiment, an alkali earth oxide particle is calcium oxide (CaO). A metal sulfate (e.g., a transition metal sulfate) can include copper sulfate, manganese sulfate, iron sulfate, cobalt sulfate, nickel sulfate, zinc sulfate, or combination(s) thereof. In at least one embodiment, a metal sulfate is copper sulfate. Mixing the alkali earth oxide, the metal sulfate, and/or elemental sulfur may be performed using a double ribbon mixer or paddle mixer configured for continuous operation or batch operation. The double ribbon mixer or paddle mixer can be operated at any suitable mixing speed and can be varied during operation if needed.

In some embodiments, the alkali earth oxide particle has a median diameter ($D^{50}$) of about ⅛" (0.318 cm) or less, such as about 1⁄32" (0.079 cm) to about ⅛" (0.318 cm), as determined by a Ro-Tap sieve lab screener or equivalent screening method familiar to those in the art. In some embodiments, the alkali earth oxide particle is milled before being used to form the first composition. For example, an alkali earth oxide particle can have a median diameter ($D^{50}$) of about 75 microns or less, such as about 2 microns to about 75 microns, as determined by a Ro-Tap sieve lab screener or equivalent screening method familiar to those in the art. In some embodiments, a weight ratio of (1) the alkali earth oxide particle to (2) the metal sulfate, on an anhydrous basis, is about 2:1 to about 5:1, such as about 4:1, alternatively 2:3 to about 3:2, such as about 1:1.

In some embodiments, the metal sulfate can be a particle having a median diameter ($D^{50}$) of about 0.2" (0.51 cm) or less, such as about 0.05" (0.13 cm) to about 0.1" (0.25 cm), as determined by a Ro-Tap sieve lab screener or equivalent screening method familiar to those in the art. In some embodiments, the metal sulfate is milled before being used to form the first composition. For example, metal sulfate particle can have a median diameter ($D^{50}$) of about 50 microns or less, about 1 to about 44 microns, as determined by a Ro-Tap sieve lab screener or equivalent screening method familiar to those in the art.

In some embodiments, introducing 102 further includes introducing a metal hydroxide particle substrate to the first composition (and/or one or more components of the first composition) such that the first composition comprises the metal hydroxide. A metal hydroxide (e.g., a transition metal hydroxide) may include copper hydroxide, manganese hydroxide, iron hydroxide, cobalt hydroxide, nickel hydroxide, zinc hydroxide, or combination(s) thereof. Metal hydroxides may react with alkali sulfides or alkali earth sulfides to form metal sulfides.

Method 100 includes introducing 104 an alkali sulfide or an alkali earth sulfide with the first composition to form a second composition. The alkali sulfide and/or alkali earth sulfide can be introduced with the first composition as dry powder or with a diluent (e.g., $H_2O$). In some embodiments, a weight ratio of (1) the alkali sulfide or the alkali earth sulfide to (2) the first composition, on an anhydrous basis, is about 1:9 to about 3:9, such as about 1:5. The alkali sulfide and/or alkali earth sulfide can promote formation of metal sulfide and/or can itself dispose on the metal hydroxide particle.

In some embodiments, the alkali sulfide and/or alkali earth sulfide of methods of the present disclosure can be a particle (e.g., a flake) having a median thickness of about 1" (2.54 cm) or less, such as about 1⁄16" (0.159 cm) to about ¼" (0.635 cm), and a median length of about 1.5" (3.81 cm) or less, such as about 0.2" to about 1.2" (3.05 cm). In some embodiments, the alkali sulfide and/or alkali earth sulfide is milled before being used to form the second composition. For example, an alkali sulfide and/or alkali earth sulfide particle (e.g., a flake) having a median diameter ($D^{50}$) of about 0.1" or less, such as about 125 microns to about 2,400 microns, such as about 1,600 microns, as determined by a Ro-Tap sieve lab screener or equivalent screening method familiar to those in the art.

An alkali sulfide of methods of the present disclosure can be sodium sulfide ($Na_2S$), potassium sulfide ($K_2S$), lithium sulfide ($Li_2S$), or combination(s) thereof. An alkali earth sulfide can be magnesium sulfide (MgS), calcium sulfide (CaS), strontium sulfide (SrS), beryllium sulfide (BeS), barium sulfide (BaS), or combination(s) thereof.

Additionally or alternatively, a metal sulfide (pre-formed) of methods of the present disclosure may be added as dry powder or with diluent to the second composition (and/or to one or more of the components of the second composition) such that the second composition comprises metal sulfide (e.g., transition metal sulfide). Pre-formed metal sulfides can include copper sulfide, manganese sulfide, iron sulfide, cobalt sulfide, nickel sulfide, zinc sulfide, or combination(s) thereof.

In some embodiments, a method (e.g., methods 100, 200, or 300) includes introducing $H_2O$ to the first composition and/or the second composition, such as the second composition. For example, if the alkali sulfides or alkali earth sulfides are introduced along with diluent that is $H_2O$ or if $H_2O$ is separately added to the first composition and/or second composition, then the $H_2O$ will serve to initialize reactions. Without being bound by theory, it is believed that reaction between the first composition, containing one or more metal sulfates, with alkali sulfides or alkali earth sulfides reacts to liberate significant amounts of $H_2O$. Nonetheless, the separate addition of $H_2O$ greatly increases the initial reaction rate and therefore serves to initialize the reactions. In addition, addition of $H_2O$ can promote better distribution of the metal sulfide precipitates during the hydration of the alkali earth oxide particle substrate, as compared to distribution of the metal sulfide precipitate when excess $H_2O$ is not used. For example, regarding method 100, the separately added $H_2O$ may be added immediately, such as within five minutes, such as within two minutes, such as less than 30 seconds, after the first composition, containing one or more metal sulfates, is introduced with alkali sulfides or alkali earth sulfides. In other words, the separately added $H_2O$ may be added immediately, such as 5 minutes or less, such as two minutes or less, such as 30 seconds or less, after formation of the second composition (e.g., methods 100, 200, or 300). In at least one embodiment, a weight ratio of (1) added $H_2O$ to (2) alkali earth oxide particle (of the first composition and/or second composition of methods 100, 200, or 300) is about 1:10 to about 1:1, such as about 1:6 to about 1:2, such as about 1:5 to about 1:3, such as about 1:4. In at least one embodiment, a weight ratio of (1) added $H_2O$ to (2) alkali earth oxide particle (of the second composition of methods 100, 200, or 300) is about 1:4.

$H_2O$ can be introduced at any suitable temperature. In some embodiments, $H_2O$ has a temperature of about 35° F. (1.7° C.) to about 200° F. (93° C.) upon introducing the $H_2O$, such as about 50° F. (10° C.) to about 150° F. (66° C.), such as about 100° F. (38° C.) to about 125° F. (52° C.).

In some embodiments, $H_2O$ is introduced as a mixture of water and an additive. An additive can be a base, such as sodium hydroxide. An additive can promote one or more reactions occurring in the first composition and/or second composition.

The alkali earth oxide substrate (of the first composition) may be present in an amount sufficient to consume most (e.g., majority of) of the remaining $H_2O$ not liberated as steam by the significant heat of reaction (exothermic reaction(s)) of the metal sulfates reaction with the alkali sulfides or alkali earth sulfides through the process of hydration reactions to form the alkali earth hydroxide particle substrates.

In addition, other reaction byproducts including but not limited to alkali sulfates and alkali earth sulfates will continue to further hydrate as the product composition cools. These additional hydration reactions also serve to reduce the final free $H_2O$ content.

In the embodiments described in the present disclosure and without being bound by any theory, the amount of $H_2O$ expelled as steam can exceed the amount of $H_2O$ reacted with the alkali earth oxide and/or reacted with byproduct alkali sulfates or alkali earth sulfates and create and dry product composition.

In addition, regarding methods 100 or 200, there is significant heat of reaction (exothermic reaction(s)) between the alkali sulfides or alkali earth sulfides and the metal sulfates as well as the heat of hydration from the metal sulfates reaction with $H_2O$ to form metal sulfides. Methods of the present disclosure allow the exothermic reaction(s) to occur separately or concurrently with one another providing control of properties of compositions of matter that are formed. Regarding method 100, the exothermic reactions create metal sulfide precipitates on a substrate transitioning from oxide to hydroxide form (as a newly created hydroxide particle) and whose surface area is increasing concurrently with the formation and precipitation of the metal sulfide. These concurrent reactions provide a well dispersed metal sulfide precipitate on a high surface area substrate. Without being bound by theory, it is believed that the heat of hydration on alkali earth oxide particle acts to disperse the metal sulfide on the surface of the hydroxide particle that is formed. Formation of a high surface area substrate during hydration either after the metal sulfide has been initially dispersed or concurrently while the metal sulfide precipitate is being formed and dispersed provides an additional improvement over other sulfide precipitate formation and dispersion methods.

In addition, for methods such as methods 100, 200, or 300, dispersion of sulfide material can continue even after the metal sulfides have been precipitated and initially dispersed on the substrate particle. For method 100, depending on initial particle size, the alkali earth oxide hydration reactions can proceed at a slower rate than the sulfate to sulfide precipitation reactions described, which provides substantial disposal of metal sulfide precipitates onto the high surface area of the newly created hydroxide particle substrate.

In addition, for methods such as methods 100, 200, or 300, the exothermic reactions provide heat of reaction that is in excess of the energy needed to liberate free $H_2O$, predominately as steam, from the composition of matter that is formed. Liberated $H_2O$ provides reduced "dusting" of powder-based starting materials, providing improved overall yield of compositions of matter and improved atom economy of the powder-based starting materials. The heat of reaction is also sufficient to create sulfides and/or polysulfides between alkali earth hydroxides and the elemental sulfur (if present). The exothermic reaction temperatures can be controlled from about 96° F. (36° C.) to about 400° F. (204.4° C.), such as about 150° F. (65.5° C.) to about 400° F. (204.4° C.) with the added $H_2O$ content and alkali earth oxide to sulfide precipitate blend ratios. A temperature above about 400° F. may promote oxidation of metal sulfide of a composition in the presence of any $H_2O$ and/or oxygen. Thus, the temperature can be controlled by, for example, an amount of $H_2O$ added in amounts/ratios described herein and/or by use of a heat exchanger (e.g., cooler) coupled with the mixer. In addition, incremental hydration of reactants can also be employed to limit peak reaction temperatures. In some embodiments, the exothermic reaction temperatures can be controlled at about 150° F. to about 300° F. (149° C.), such as about 212° F. (100° C.) to about 300° F. (149° C.), such as about 220° F. (104° C.) to about 250° F. (121° C.).

The high alkalinity hydroxide particle substrate helps to minimize the formation of $H_2S$ in a high humidity mixing environment and during storage.

In some embodiments, methods of the present disclosure (e.g., methods 100, 200, or 300) may be performed in a single mixer. For example, the alkali sulfide and/or alkali earth sulfide of method 100 can be introduced with the first composition by adding the alkali sulfide and/or alkali earth sulfide into the same mixer used to form the first composition. The reactions can proceed under near atmospheric conditions. Furthermore, the heat of reaction(s) create a substantially self-inerting steam environment with the liberated $H_2O$. In some embodiments, air infiltration into the mixer can be minimized to prevent sulfide deactivation due to oxidation reactions at reaction temperatures and humidity conditions that may be present in the mixer. For example, the mixer can be self-inerting in that the mixer is configured to vent ("off-gas") liberated $H_2O$, predominantly as steam, from the mixer (e.g., the mixer has a sufficiently small headspace) by utilizing the heat of the exothermic reactions, and the liberated $H_2O$ promotes removal of air from the mixer. An example of a self-inerting mixer is any suitable double ribbon mixer or paddle mixer operated in continuous or batch mode. As the exothermic reactions substantially finish, the pressure provided by the liberated $H_2O$ will reduce and air that is outside of the mixer can have a tendency to backfill an interior volume of the mixer. Accordingly, in some embodiments, a vent of the mixer can be closed and/or an inert gas (e.g., nitrogen or argon) can be backfilled into the mixer. For example, an inert gas can be backfilled into the mixer as the pressure provided by liberated $H_2O$ begins to reduce. Then (e.g., a few minutes later), the vent of the mixer can be closed. Further, the mixer headspace may be placed under a slight negative pressure to help facilitate $H_2O$ removal.

The second composition (e.g., methods 100, 200, or 300) can be mixed for about 1 minute or more, such as about 5 minutes or more, such as about 5 minutes to about 60 minutes, such as until a majority of steam off-gassing from exothermic reaction(s) is completed. When operating a single mixer in a batch mode, the amount of time of mixing the second composition can depend on the batch size where larger batch sizes typically have longer time of mixing than the time of mixing of smaller batch sizes. In continuous mode, parameters may be modified as necessary, as recognized by those skilled in the art. The amount of time of mixing can depend on the mean diameter ($D_{50}$) of the alkali sulfide and/or alkali earth sulfide particle. For example, a larger mean diameter decreases the reaction rate and efficiency with the metal sulfate of the first composition, and longer mixing times can be used. The amount of time of mixing can also depend on the mean diameter ($D_{50}$) of the alkali earth oxide particle. For example, a larger mean diameter decreases the rate of hydration of the alkali earth oxide particle, and longer mixing times can be used. In some embodiments, the second composition can be mixed for about 40 minutes to about 60 minutes, such as about 50 minutes. In some embodiments, a smaller mean diameter increases the rate of hydration of the alkali earth oxide particle, and shorter mixing times can be used. In some embodiments, the second composition can be mixed for about 1 minute to about 20 minutes, such as about 5 minutes to about 15 minutes, such as about 10 minutes. Smaller mean diameter of an alkali earth oxide particle (e.g., the oxide particle is milled before forming the first composition) can be advantageous in embodiments where the product composition (having a composition of matter and an admixture material) are milled. Milling a product composition can expose some alkali earth oxide content of an alkali earth hydroxide particle substrate and unreacted alkali sulfides and/or alkali earth sulfides. If $H_2O$ is present in an admixture material of the product composition, the $H_2O$ will promote hydration of the exposed alkali earth oxide content. The hydration will promote heat formation such that, if enough heat is formed, metal sulfide and/or admixture material of the product composition of matter could oxidize in the presence of $H_2O$ or oxygen. Oxidation of metal sulfide and/or admixture material could reduce the effectiveness of contaminant capture of the product composition while in use.

In the early time period of mixing the second composition (e.g., method 100), the second composition can have a wet paste consistency in the mixer. The consistency can rapidly change such that the second composition has flowing particulates as the alkali earth substrate hydrates form and excess moisture evaporates. The free-flowing particulates obtained include composition(s) of matter of the present disclosure.

In some embodiments, a first composition (e.g., of methods 100, 200, or 300) is mixed, followed by stopping the mixing. Then, the components used to form the second composition are added to the mixer, followed by commencing mixing once again. In this way, mixing of components with the first composition can be performed in a controlled manner because the first composition and additional components (e.g., alkali sulfide or alkali earth sulfide) added to the mixer can be biphasic (e.g., the first composition is dry/paste and the additional components are also dry/paste such that the additional components and the first composition contact each other merely at the interface between the additional components and the first composition). For example, in process 104 of method 100, an alkali sulfide or alkali earth sulfide is introduced with the first composition. If mixing occurring during process 102 has been stopped, the alkali sulfide or alkali earth sulfide can be introduced with the first composition, and mixing can then be commenced in a controlled manner to form the second composition. Additionally or alternatively, mixing of the second composition may be stopped, followed by addition of $H_2O$, followed by commencing mixing to provide controlled hydration and temperature control of alkali earth oxide.

In some embodiments, the mixer may be preheated before components (e.g., of the first composition) are introduced into the mixer which reduces or prevents reactions occurring (e.g., in the first composition or the second composition) from lagging in an undesirable way. For example, if a mixer is located in a cold environment, it may be useful to preheat the mixer before introducing components into the mixer. The mixer can be physically preheated (e.g., a heat jacket disposed around the mixer) and/or can be chemically preheated (e.g., water introduced to an alkali earth oxide particle in the mixer to commence exothermic hydration of the alkali earth oxide particle). In some embodiments, a mixer can be heated (physically) during a method of the present disclosure which may provide simultaneous indirect and chemical heating/drying.

In some embodiments, it can be advantageous to introduce the alkali earth oxide to the mixer first before any other components in order to fill void spaces (e.g., nooks) in the mixer. It has been discovered that introducing the alkali earth oxide first to the mixer (as opposed to other more reactive components) provides sustained quality of the hardware of the mixer over time.

Due to the combined exothermic reactions, such as due to the alkali earth hydration reaction, no subsequent drying of the composition(s) of matter formed is needed. Alternatively, any suitable drying of the composition(s) of matter may be used. Additionally or alternatively, post milling of the composition(s) of matter might not be needed due to the alkali earth hydration reaction's effect on reducing particle size as compared to the particle size of the alkali earth oxide particle as well as the initial size of the metal sulfate and alkali sulfide and/or alkali earth sulfide.

Method 100 (and/or methods 200 or 300) can further include introducing 106 (or 206 of FIG. 2, or 306 of FIG. 3) a composition of matter with an admixture material to form a product composition. An admixture material can be an adsorbent. Admixture materials can be silica (e.g., sand such as frac sand), activated carbon, alkali earth oxides, hydrates, carbonates, alkali earth sulfates, combustion derived alkali ash (also known as "fly ash"), or mixture(s) thereof. Because no subsequent drying of the composition(s) of matter formed is needed, the admixture material can be introduced with the composition of matter in the same mixer that may be used at processes 102 and 104 of FIG. 1 or at processes 202 or 204 of FIG. 2 or at processes 302 or 304 of FIG. 3.

In some embodiments, the admixture material is introduced after the metal sulfide has been disposed on the hydroxide particle substrate. During use of the product composition, the admixture material can be used as a co-adsorbent selected to import the overall sorbents performance for desired applications.

In some embodiments, an admixture material is introduced to a composition of matter while the composition of matter still has substantial heat (e.g., from exothermic reactions). The admixture material can rapidly cool the composition of matter (and overall product composition), for example, to below 150° F. An ability to introduce admixture material while a composition of matter has substantial heat, in addition to being performed in the same mixer used to form the composition of matter, promotes throughput of processes of the present disclosure. After the completion of reactions occurring in the second composition described above, the composition of matter formed will cool due to radiant heat loss, which is an indicator of substantial completeness of exothermic reactions. In some embodiments, the composition of matter is cooled (actively or passively) before being introduced with the admixture material, and the admixture material may provide cooling of the overall product composition.

In some embodiments, introducing a variety of admixture materials to form a product composition can allow adjustment of the density, free moisture, and flowability of the product composition.

Alternative, but less preferred, methods for producing metal sulfides disposed on particle substrates may include mixing an alkali earth hydroxide (or alkali earth oxide), metal sulfate, and alkali sulfide (or alkali earth sulfide) regardless of order of addition of the alkali earth hydroxide (or alkali earth oxide), metal sulfate, and alkali sulfide (or alkali earth sulfide) to each other. The end product formed can be dried using any suitable/conventional drying method from an external heat source. Additionally or alternatively, a metal sulfide is mixed with an alkali earth hydroxide. Additionally or alternatively, an alkali earth hydroxide (or alkali earth oxide) of a method of the present disclosure may be substituted with a particle substrate that is an alkali earth carbonate and/or sulfate.

Compositions of Matter

The present disclosure is also directed to compositions of matter that can be formed by methods of the present disclosure. A composition of matter can include an alkali earth hydroxide particle, and a transition metal sulfide disposed on the alkali earth hydroxide particle. The composition of matter may further include a polysulfide disposed on the alkali earth hydroxide particle. The composition of matter may further include an alkali sulfide and/or alkali earth sulfide, and/or polysulfides of the alkali sulfide and/or alkali earth sulfide, disposed on the alkali earth hydroxide particle.

An alkali earth hydroxide particle can include magnesium hydroxide ($Mg(OH)_2$), calcium hydroxide ($Ca(OH)_2$), barium hydroxide ($Ba(OH)_2$), hydrate(s) thereof, or combination(s) thereof. In at least one embodiment, an alkali earth hydroxide particle is calcium hydroxide ($Ca(OH)_2$). In some embodiments, a composition of matter has an alkali earth hydroxide particle content of about 50 wt % to about 95 wt %, such as about 60 wt % to about 90 wt %, such as about 70 wt % to about 80 wt %, based on a total weight of the composition of matter.

A metal sulfide can include copper sulfide, manganese sulfide, iron sulfide, cobalt sulfide, nickel sulfide, zinc sulfide, or combination(s) thereof. In at least one embodiment, a metal sulfide is copper sulfide. In some embodiments, a composition of matter has a metal sulfide content of about 3 wt % to about 20 wt %, such as about 5 wt % to about 15 wt %, based on a total weight of the composition of matter. For example, a metal sulfide can have about 3 wt % to about 20 wt %, such as about 5 wt % to about 15 wt %, such as about 100 wt %, of CuS content based on a total weight of the metal sulfide. The metal sulfide can have a remainder balance of other metal sulfide species, such as $CuS_2$, $Cu_9S_8$, and/or the like. It has been discovered that a high CuS content of the metal provides improved contaminant capture (e.g., mercury).

A polysulfide can be an alkali earth polysulfide, such as a calcium polysulfide, magnesium polysulfide, barium polysulfide, or combination(s) thereof. In some embodiments, a composition of matter has a polysulfide content of about 0.1 wt % to about 15 wt %, such as about 0.1 wt % to about 3 wt %, based on a total weight of the composition of matter.

An alkali sulfide can be sodium sulfide ($Na_2S$), potassium sulfide ($K_2S$), lithium sulfide ($Li_2S$), or combination(s) thereof. In some embodiments, a composition of matter has an alkali sulfide content of about 0.1 wt % to about 15 wt %, such as about 0.1 wt % to about 3 wt %, based on a total weight of the composition of matter.

An alkali earth sulfide can be magnesium sulfide (MgS), calcium sulfide (CaS), barium sulfide (BaS), and combination(s) thereof. In some embodiments, a composition of matter has an alkali earth sulfide content of about 0.1 wt % to about 15 wt %, such as about 0.1 wt % to about 5 wt %, such as about 0.1 wt % to about 3 wt %, based on a total weight of the composition of matter.

It has been further discovered that processes of the present disclosure can provide alkali earth hydroxide particles having one or more advantageous crystal morphologies that promote high exposed surface area of the particles for metal sulfides to dispose thereon. For example, an alkali earth hydroxide particle can have a predominantly hexagonal crystal structure, as determined by x-ray crystallography, and/or a crystal size of submicron to multimicron, as determined by x-ray crystallography.

The alkali earth hydroxide particle of the present disclosure may have about 0.1 wt % to about 30 wt % alkali earth oxide content, such as about 5 wt % to about 10 wt % alkali earth oxide, based on a total weight of the alkali earth hydroxide particle, respectively. For example, hydrolysis of alkali earth oxide particle to form alkali earth hydroxide particle might not be a complete conversion, and an amount of alkali earth oxide may remain with (e.g., within) the alkali earth hydroxide particle. The remaining alkali earth oxide content of the composition of matter can reduce the potential for sulfide deactivation during handling and storage of the compositions of matter over time of a composition of matter of the present disclosure, as compared to a composition of matter that does not have any alkali earth oxide content. Meanwhile, the alkali earth hydroxide particle can have a high alkali earth hydroxide content to provide, inter alia, thermal stability to a composition of matter of the present disclosure. An alkali earth hydroxide particle having a high alkali earth hydroxide content can provide higher thermal stability to a composition of matter than an alkali earth hydroxide particle having a lower alkali earth hydroxide content. Thermal stability performance also depends on the specific alkali earth hydroxide. For example, magnesium hydroxide ($Mg(OH)_2$) undergoes endothermic decomposition at 332° C. (630° F.). In at least one embodiment, a composition of matter can have about 70 wt % to about 99.9 wt % alkali earth hydroxide, such as about 90 wt % to about 95 wt % alkali earth hydroxide, based on a total weight of the alkali earth hydroxide content plus alkali earth oxide content of the composition of matter.

In addition, embodiments producing side reactions of alkali sulfates and alkali earth sulfates of varying degrees of hydration can also provide thermal stability due to the energy required for dehydration reactions.

In embodiments where an excess of alkali earth oxide is used relative to H$_2$O, a composition of matter may be bimodal (e.g., as determined by a Ro-Tap sieve lab screener or equivalent screening method familiar to those in the art). For example, a composition of matter may have a first fraction having a first size distribution and a second fraction having a second size distribution different than the first size distribution. Metal sulfides can be disposed on both the alkali earth oxide and alkali earth hydroxide.

Additionally or alternatively, an alkali earth hydroxide particle can have low magnesium content (e.g., can be substantially free of magnesium). In at least one embodiment, an alkali earth hydroxide particle has a magnesium content of about 3 wt % or less, such as about 2 wt % or less, such as about 1 wt % or less, such as about 0.8 wt % or less, such as about 0.5 wt % or less, such as about 0.2 wt % or less, such as about 0.1 wt % or less, based on a total weight of the alkali earth hydroxide particle. In at least one embodiment, an alkali earth hydroxide particle is substantially free of magnesium atoms (e.g., an alkali earth hydroxide particle has a magnesium content of about 0 wt %). Alternatively, in embodiments where calcium oxide is used as an alkali earth oxide of a method of the present disclosure, an alkali earth hydroxide particle can have a high magnesium content. For example, an alkali earth hydroxide particle can have a magnesium content of about 20 wt % to about 99 wt %, such as about 30 wt % to about 50 wt %, such as about 40 wt %, based on a total weight of the alkali earth hydroxide particle.

If an alkali earth oxide particle has a small median diameter (e.g., it is milled before being used to form the first composition), then a higher amount of alkali earth hydroxide content can be obtained, as compared to an alkali earth oxide particle having a larger median diameter. In some embodiments, an alkali earth hydroxide particle has about 50 wt % or greater alkali earth hydroxide, has about 95 wt % to about 99.9 wt % alkali earth hydroxide, such as about 98 wt % to about 99.9 wt % alkali earth hydroxide, based on a total weight of the alkali earth hydroxide particle, respectively (not including any impurity fractions in the particle).

In at least one embodiment, a composition of matter has a median diameter (D$^{50}$) of about ⅛" (0.318 cm) or less, such as about 1/46" (0.055 cm) to about ⅑" (0.282 cm), as determined by a Ro-Tap sieve lab screener or equivalent screening method familiar to those in the art. A dry type analyser can also be used beneficially since a portion of the composition is potentially soluble and therefore does not accurately register in a wet type laser analyser. It has been discovered that median diameter of a composition of matter of the present disclosure can provide an advantageous amount of exposed surface area of the composition of matter to promote capture of contaminants when used in a contaminant capture process, in combination with providing advantageous flowability of the composition of matter in a contaminant capture apparatus (e.g., in a duct of a flue gas processing apparatus). In some embodiments, the composition of matter can be milled/deagglomerated to provide a composition of matter having a smaller median diameter.

In at least one embodiment, a composition of matter is substantially free of an admixture material (such as a filler material). For example, a composition of matter itself is substantially free of an admixture material because an admixture material (e.g., filler material) was not used in the method of forming the composition of matter. For example, a composition of matter has a support particle (e.g., Ca(OH)$_2$) that is substantially free of an admixture material (such as a filler material). In at least one embodiment, an admixture material may be selected from a clay or a carbon-based material (such as activated carbon, calcium carbonate), calcium sulfate, magnesium sulfate, magnesium carbonate, magnesium hydroxide, a silicon-based material (such as silica (SiO$_2$)), a hygroscopic material (e.g., hygroscopic solid), or combination(s) thereof. In some embodiments, a filler material may be an activated carbon, an alkali earth oxide, a hydrate (such as calcium hydroxide, or magnesium hydroxide), a carbonate, an alkali earth sulfate, a combustion derived alkali ash (also referred to as "fly ash"), or combination(s) thereof. A composition of matter can have about 80 wt % or less admixture material content, such as about 40 wt % or less, such as about 30 wt % or less, such as about 20 wt % or less, such as about 10 wt % or less, such as 0 wt % admixture material content, alternatively about 20 wt % to about 80 wt %, based on a total weight of the composition of matter.

Additionally or alternatively, because compositions of matter of the present disclosure can be formed in a self-drying manner (e.g., by performing exothermic reactions), the compositions of matter can have low moisture content (e.g., low H$_2$O content). In at least one embodiment, a composition of matter has a moisture (e.g., H$_2$O) content of about 5 wt % or less, such as about 2 wt % or less, such as about 1 wt % or less, such as about 0.8 wt % or less, such as about 0.5 wt % or less, such as about 0.2 wt % or less, such as about 0.1 wt % or less, based on a total weight of the composition of matter. A low moisture content provides reduced or eliminated sulfide deactivation during storage and use of compositions of matter of the present disclosure. A low moisture content can be obtained without filtration/drying and/or the use of additional hygroscopic materials added to a composition of matter (or composition(s) thereof) of the present disclosure, which provides cost benefits.

Additionally or alternatively, because compositions of matter of the present disclosure may be formed without the use of halogen-containing starting materials (reagents), the compositions of matter can have low halogen content (e.g., can be substantially free of halogen). In at least one embodiment, a composition of matter has a halogen content of about 4 wt % or less, such as about 2 wt % or less, such as about 1 wt % or less, such as about 0.8 wt % or less, such as about 0.5 wt % or less, such as about 0.2 wt % or less, such as about 0.1 wt % or less, based on the weight of halogen atoms of a total weight of the composition of matter. In at least one embodiment, a composition of matter is substantially free of halogen atoms (e.g., the composition of matter has a halogen content of about 0 wt %). A low moisture content and/or low halogen content of compositions of matter of the present disclosure can provide lower corrosion potentials of components of a contaminant removal processing system (such as a duct of a flue gas processing system), which in turn provides lower overall cost of mercury compliance because components of the processing system do not corrode as often and need not be replaced as often, as compared to processes and materials utilizing halogens. Nonetheless, compositions of matter of the present disclosure retain high effectiveness of removal of mercury-containing contaminants per pound of fly ash product.

Product Compositions Having Composition(s) of Matter and an Admixture Material

The present disclosure further relates to product compositions having one or more composition(s) of matter and admixture material. For example, one or more composition(s) of matter (e.g., having low admixture material content) can be formed as described above, and the composition(s) of matter can then be introduced with one or more admixture materials to form a product composition of the present disclosure.

In some embodiments, a product composition is formed by mixing composition(s) of matter as a powder with a admixture material also as a powder. Product compositions of the present disclosure can include multiple (e.g., different) compositions of matter. For example, a product composition can have, in addition to admixture material, a first composition of matter and a second composition of matter. In some embodiments, a product composition has about 20 wt % to about 80 wt %, such as about 50 wt % to about 70 wt %, of a first composition of matter, based on the amount of composition(s) of matter in the product composition. In some embodiments, a product composition has about 20 wt % to about 80 wt %, such as about 30 wt % to about 50 wt %, of a second composition of matter, based on the amount of composition(s) of matter in the product composition. In some embodiments, a first composition of matter has an alkali earth hydroxide particle that is $Ca(OH)_2$, and a second composition of matter has an alkali earth hydroxide particle that is $Mg(OH)_2$.

In some embodiments, a product composition can include about 1 wt % to about 50 wt % of admixture material, such as about 10 wt % to about 40 wt %, such as about 15 wt % to about 25 wt % of admixture material, based on a total weight of composition of matter+admixture material. In some embodiments, a product composition can include about 50 wt % to about 99 wt % of composition of matter, such as about 60 wt % to about 90 wt %, such as about 75 wt % to about 85 wt % of composition of matter, based on a total weight of composition of matter+admixture material.

An admixture material may be a filler material or an adsorbent. In at least one embodiment, an admixture material may be selected from a clay or a carbon-based material (such as activated carbon, calcium carbonate), calcium sulfate, or combination(s) thereof. In some embodiments, an admixture material may be a fractional sized ceramic or silica particle, an activated carbon, an alkali earth oxide, a hydrate (such as calcium hydroxide or magnesium hydroxide), a bicarbonate (such as calcium bicarbonate), an alkali earth sulfate, a combustion derived alkali ash (also referred to as "fly ash"), or combination(s) thereof. It has been discovered that a hydrate such as magnesium hydroxide and/or a carbonate such as sodium bicarbonate present in a product composition can provide thermal stability of a product composition during handling and storage for use in a high temperature environment (such as a flue gas in a duct). These granular additives can also provide (e.g., during mixing and pneumatic transport) size reduction of bimodal particle size distributions of compositions of matter of the present disclosure. Size reduction provides reduced or eliminated caking or plugging in a mixer or during use of a product composition.

An admixture material may have a median diameter ($D^{50}$) of about 1/8" (0.318 cm) or less, such as about 1/46" (0.055 cm) to about 1/9" (0.282 cm), as determined by a Ro-Tap sieve lab screener or equivalent screening method familiar to those in the art. A product composition of the present disclosure may have a median diameter ($D^{50}$) of about 1/9" (0.282 cm) or less, such as about 1/46" (0.055 cm) to about 1/9" (0.282 cm), as determined by a Ro-Tap sieve lab screener or equivalent screening method familiar to those in the art. It has been discovered that median diameter of an admixture material and/or product composition of the present disclosure can provide advantageous flowability of the filler material and/or product composition in a contaminant capture apparatus (e.g., in a duct of a flue gas processing apparatus). The admixture material and/or product composition can be milled/deagglomerated to provide a product composition having a smaller median diameter.

In at least one embodiment, an admixture material is a fractional sized ceramic or silica particle, such as a frac sand. It has been discovered that use of a fractional sized ceramic or silica particle (e.g., frac sand) as an admixture material can provide improved compressibility or cohesiveness of a product composition as due to uniform size and shape of, for example, a frac sand, which provides improved flowability of a product composition. Furthermore, fractional sized ceramic or silica particles can scratch a composition of matter of the present disclosure during use to provide exposure of underlying sulfide content of the composition of matter. In addition, fractional sized ceramic or silica particles of product compositions of the present disclosure can provide increased density of the product composition (e.g., 2000 lbs/bag if fractional sized ceramic or silica particles are present versus 1400 lbs/bag if fractional sized ceramic or silica particles are not present) which provides economic advantages (e.g., shipping, etc.).

A fractional sized ceramic or silica particle can have a size of about 6 to 270 U.S. Mesh, such as about 20 to 40 U.S. Mesh, such as about 30 to 50 U.S. Mesh, or about 40 to 70 U.S. Mesh. For example, the size of the fractional sized ceramic or silica particle can be expressed as a grain fineness number (GFN) of about 15 to about 300, or about 30 to about 110, or about 40 to about 70. According to such examples, a sample of fractional sized ceramic or silica particles can be screened in a laboratory for separation by size, for example, intermediate sizes between 20, 30, 40, 50, 70, 100, 140, 200, and 270 U.S. mesh sizes to determine GFN. GFN can be determined according to Procedure 106-87-S of the American Foundry Society Mold and Core Test Handbook.

A fractional sized ceramic or silica particle can have any suitable shape. For example, a fractional sized ceramic or silica particle can be substantially spherical, cylindrical, square, rectangular, elliptical, oval, egg-shaped, or pill-shaped. In some embodiments, the fractional sized ceramic or silica particle is substantially spherical. For example, the fractional sized ceramic or silica particles can have an average sphericity value of about 0.5 or greater, about 0.7 or greater, about 0.8 or greater, or about 0.9 or greater compared to a Krumbein and Sloss chart. The fractional sized ceramic or silica particles can have an average roundness value of about 0.5 or greater, about 0.7 or greater, about 0.8 or greater, or about 0.9 or greater compared to a Krumbein and Sloss chart.

A fractional sized ceramic or silica particle can have any suitable density. For example, a fractional sized ceramic or silica particle can have a density of about 1.6 g/cc to about 3.5 g/cc, about 1.8 g/cc to about 3.2 g/cc, about 2.0 g/cc to about 2.7 g/cc, about 2.1 g/cc to about 2.4 g/cc, or about 2.2 g/cc to about 2.6 g/cc. A fractional sized ceramic or silica particle can have any suitable bulk density or packing density. For example, a fractional sized ceramic or silica particle can have a bulk density of about 1.3 g/cc to about 1.8 g/cc, about 1.35 g/cc to about 1.65 g/cc, or about 1.5 g/cc to about 1.9 g/cc.

In some embodiments, an activated carbon is used as an admixture material. Activated carbon used as an admixture material can rapidly adsorb oxidized mercury species, allowing the added activated carbon to readily capture already oxidized mercury species and thereby reduce the amount of sulfide reagents used to form composition(s) of matter of the present disclosure. In addition, activated carbon can serve as an adsorption buffer against oxidized mercury reemission potentials in downstream equipment when loosely adsorbed oxidized mercury species on fly ash are liberated due to temperature or pH excursions.

Removing Contaminant(s) from Fluids (Such as Gaseous Streams)

A composition of matter (or product composition thereof) of the present disclosure may be used in processes for removing contaminants from a fluid (such as a gaseous stream) such as removing mercury-containing contaminants from a gas stream. The composition of matter (or product composition thereof) may be used at coal-fired power plants (e.g., bituminous coal-fired, or lignite-fired power stations), natural gas refineries, precious metal mines, waste incineration plants (e.g., domestic waste, hazardous waste, or sewage sludge incineration plants), other plants for high-temperature processes (e.g., cement burning), and high-temperature plants co-fired with waste or combined (multistage) high-temperature plants (e.g., power stations or cement rotary kilns having an upstream waste pyrolysis or waste gasification). For example, a composition of matter (or product composition thereof) may be introduced into a gas stream derived from a heat generating system selected from a combustion system, a power plant combustion system, a coal combustion system, a waste incineration system, a kiln, a kiln for mining operations, a recovery boiler, a coal gasification process stream, a gas production stream, a biomass combustion system, or an ore processing system.

In some embodiments, a method for reducing an amount of a contaminant in a flue gas includes introducing a composition of matter (or product composition thereof) with a flue gas, wherein the composition of matter includes an alkali earth hydroxide particle, a metal sulfide disposed on the particle, and an optional polysulfide disposed on the particle. Methods may further include introducing an admixture material with the flue gas. For example, a product composition of the present disclosure having a composition of matter and an admixture material can be introduced with the flue gas. A contaminant that can be removed from the flue gas can be a mercury-containing contaminant (such as elemental mercury or oxidized mercury). In some embodiments, the flue gas has a temperature of about 230° F. to about 850° F., such as about 250° F. to about 800° F., such as about 275° F. to about 350° F., as measured at a duct. In some embodiments, a method for reducing an amount of a contaminant in a flue gas includes providing a flue gas to a duct at a volumetric flow rate of about $10 \times 10^3$ m$^3$ S.T.P. db/h to about $20 \times 10^3$ m$^3$ S.T.P. db/h, such as about $15 \times 10^3$ m$^3$ S.T.P. db/h.

Processes can include introducing a composition of matter (or product composition thereof) to a gas stream (such as a flue gas) ahead of a particulate matter collection device, in order to adsorb or oxidize at least a portion of a mercury containing compound. The particulate matter collection device may be one or more of the following devices: electrostatic precipitation (ESP) device, filtration device, inertial separation device, baghouse, cyclone, spray dry absorber (SDA), wet fluegas desulfurizer (wFGD), or combination(s) thereof. In some embodiments, there are a plurality of particulate collection devices; optionally where one of the particulate collection devices is positioned subsequent to another particulate collection device.

In some embodiments, the composition of matter (or product composition thereof) may be applied to the gas stream by housing the composition of matter (or product composition thereof) in a fixed bed apparatus through which the gas stream is made to pass. In at least one embodiment, the sorbent composition may be contained within a fiber bag used in a filter baghouse. In another embodiment, the composition of matter (or product composition thereof) may be applied to the gas stream through various methods, for example, through a lance, an additional medium such as a fuel source (e.g., coal), a conveyor belt, or one or more ports in communication with a combustion system (e.g., asymmetrically placed ports). The composition of matter (or product composition thereof) may be exposed to a gas stream by applying the composition of matter (or product composition thereof) into the gas stream with a carrier gas; optionally where the carrier gas is air or nitrogen; optionally where the carrier gas is applied upstream of a particulate control device; and optionally where the particulate matter collection device contains at least one of the following devices: ESP, baghouse, or cyclone.

The gas stream may further include at least one of the following halogens: chloride, bromide, iodide, and salts thereof. The gas stream may further include sulfur dioxide and sulfur trioxide.

In at least one embodiment, the composition of matter (or product composition thereof) is injected into the flue gas of a coal fired power plant at a location between the air preheater and the particulate control device. To carry out the injection, the composition of matter (or product composition thereof) is fed from a feeding silo and pneumatically carried through injection lances positioned within the flue gas duct work thereby affording a fine dispersion of the material within the flue gas, covering a substantial portion (e.g., substantially all) of the cross-sectional area of the duct. Feed rates of the composition of matter (or product composition thereof) are determined gravimetrically and can be set about 0.1 to about 10 lb/MMscf (pounds per million standard cubic feet) according to the desired mercury capture targets. The capture of mercury from the flue gas by the composition of matter (or product composition thereof) can be verified by measurements of flue gas mercury concentrations made by Appendix K sorbent traps and continuous mercury emission monitors (Hg-CEMs), as well as by measurement of the level of mercury in ash.

In some embodiments, a method includes monitoring mercury-containing contaminant emissions and responding with the addition of said composition of matter (or product composition thereof) in accordance with the mercury levels in the system.

In some embodiments, the composition of matter (or product composition thereof) may be mixed with an alkaline sulfur oxide sorbent slurry in a slurry holding tank, feed tank, recirculation line, feed line, or in-line with a mixing chamber prior to application of the slurry to the gas stream. The mixing chamber can be attached or in communication with a receptacle that holds/processes through (e.g. a conduit) a mixed product.

In certain embodiments, the composition of matter (or product composition thereof) may be introduced to the gas stream as a powder blended with other mercury sorbents such as activated carbon, halogenated activated carbon (e.g., chlorinated activated carbon or brominated activated carbon), and inorganic mercury sorbents. The other mercury sorbent may be added separately from the composition of matter (or product composition thereof) by such methods as DSI (Duct Sorbent Injection).

In some embodiments, the composition of matter (or product composition thereof) may be introduced with the gas stream along with an oxidizing agent. The oxidizing agent may be combined with the composition of matter (or product composition thereof) prior to treatment of a flue gas.

In some embodiments, the oxidizing agent may be applied to the gas stream prior to, after, and/or at the same time of application of the composition of matter (or product composition thereof) to the flue gas. The oxidizing agent may be introduced with the gas stream through one or more mediums. In at least one embodiment, the medium is coal and the gas stream derives from at least a coal combustion system. The oxidizing agent may be selected from a thermolabile molecular halogen, calcium bromide, or halogen-containing compounds such as hydrogen bromide, hydrogen chloride, ammonium bromide, ammonium chloride, sodium chloride, sodium bromide, calcium chloride, calcium bromide, or combination(s) thereof.

In certain embodiments, the composition of matter (or product composition thereof) may be introduced with the gas stream without any additional oxidizing agent. The composition of matter (or product composition thereof) may act as an oxidizing agent for elemental mercury in the gas stream. The composition of matter (or product composition thereof) may serve as both an oxidant and a sorbent to remove mercury-containing contaminant(s) from a flue gas stream.

Overall, methods and compositions of matter (and product compositions thereof) have been developed that have resulted in substantial improvements over conventional adsorbents and conventional methods of making adsorbents. Methods and compositions of matter of the present disclosure utilize metal sulfides disposed on solid non-silicate-based substrates. Alkali sulfide and/or alkali earth sulfide may also be disposed on the solid non-silicate-based substrates. Methods of making the compositions of matter provide a substrate having a precipitated metal sulfide disposed thereon, and the composition of matter does not need heat from an external heat source in order for the chemical reactions to occur and does not need a drying step after the composition of matter has been formed. Compositions of matter of the present disclosure can also have a high exposed surface area (provided by the unique reaction conditions to produce the compositions of matter) which provide enhanced mercury capture as compared to conventional adsorbents. Compositions of matter of the present disclosure provide effective adsorbents having lower corrosion potentials and lower overall cost of mercury compliance, as compared to conventional adsorbents. For example, compositions of matter of the present disclosure can be halogen-free adsorbents with high effectiveness per pound of product are of particular interest.

Additional Aspects

The present disclosure provides, among others, the following aspects, each of which may be considered as optionally including any alternate aspects.

Clause 1. A method for producing an alkali earth particle having a metal sulfide disposed thereon, the method comprising:
introducing an alkali earth oxide particle with a metal sulfate to form a first composition; and
introducing an alkali sulfide or an alkali earth sulfide with the first composition to form a second composition.

Clause 2. The method of Clause 1, further comprising combining elemental sulfur with the alkali earth oxide particle, the metal sulfate, the first composition, or combination(s) thereof, wherein the first composition comprises the elemental sulfur.

Clause 3. The method of Clauses 1 or 2, wherein the alkali earth oxide particle is an alkali earth oxide powder.

Clause 4. The method of any of Clauses 1 to 3, wherein the metal sulfate is a metal sulfate powder.

Clause 5. The method of any of Clauses 1 to 4, further comprising introducing $H_2O$ with the first composition or the second composition.

Clause 6. The method of any of Clauses 1 to 5, wherein the $H_2O$ is introduced with the second composition within 60 seconds or less after the second composition is formed.

Clause 7. The method of any of Clauses 1 to 6, wherein a weight ratio of (1) the $H_2O$ to (2) the alkali earth oxide particle is about 1:10 to about 1:1.

Clause 8. The method of any of Clauses 1 to 7, wherein a weight ratio of (1) the $H_2O$ to (2) the alkali earth oxide particle is about 1:4.

Clause 9. The method of any of Clauses 1 to 8, wherein the metal sulfate is a transition metal sulfate.

Clause 10. The method of any of Clauses 1 to 9, wherein the metal sulfate is copper sulfate.

Clause 11. The method of any of Clauses 1 to 11, wherein:
an alkali earth oxide particle is introduced with the metal sulfate, and
the alkali earth oxide particle is a calcium oxide particle.

Clause 12. The method of any of Clauses 1 to 12, wherein:
an alkali sulfide is introduced with the first composition, and
the alkali sulfide is sodium sulfide.

Clause 13. The method of any of Clauses 1 to 12, wherein the second composition has a temperature of about 96° F. (36° C.) to about 400° F. (204.4° C.) at some time during the method.

Clause 14. The method of any of Clauses 1 to 13, wherein the temperature is obtained without use of a heating element.

Clause 15. The method of any of Clauses 1 to 14, wherein:
introducing the alkali earth oxide with the metal sulfate is performed in a mixing vessel, and
introducing the alkali sulfide or the alkali earth sulfide with the first composition is performed in the mixing vessel.

Clause 16. The method of any of Clauses 1 to 15, wherein the mixing vessel is a double ribbon mixer.

Clause 17. The method of any of Clauses 1 to 16, further comprising:
venting $H_2O$, via a vent having an open configuration, from the mixer;
introducing an inert gas into the mixer while the vent has the open configuration; and
reconfiguring the vent into a closed configuration.

Clause 18. The method of any of Clauses 1 to 17, wherein combining elemental sulfur forms a polysulfide disposed on the alkali earth hydroxide particle.

Clause 19. The method of any of Clauses 1 to 18, wherein the polysulfide formed is an alkali earth polysulfide.

Clause 20. The method of any of Clauses 1 to 19, wherein the method is performed in an ambient atmosphere.

Clause 21. The method of any of Clauses 1 to 20, further comprising mixing the first composition for about 5 minutes to about 60 minutes before introducing the alkali sulfide or the alkali earth sulfide with the first composition.

Clause 22. The method of any of Clauses 1 to 21, wherein the alkali earth oxide particle has a median diameter ($D^{50}$) of about 1/8" (0.318 cm) or less, as determined by a Ro-Tap sieve lab screener or equivalent screening method familiar to those in the art.

Clause 23. The method of any of Clauses 1 to 22, wherein the alkali earth oxide particle has a median diameter ($D^{50}$) of about 1/32" (0.079 cm) to about 1/8" (0.318 cm), as determined by a Ro-Tap sieve lab screener or equivalent screening method familiar to those in the art.

Clause 24. The method of any of Clauses 1 to 23, further comprising mixing the second composition for about 40 minutes to about 60 minutes.

Clause 25. The method of any of Clauses 1 to 24, further comprising mixing the second composition for about 5 minutes to about 15 minutes.

Clause 26. The method of any of Clauses 1 to 25, wherein a weight ratio of (1) the alkali earth oxide particle to (2) the metal sulfate is about 2:1 to about 5:1.

Clause 27. The method of any of Clauses 1 to 26, wherein the weight ratio is about 4:1.

Clause 28. The method of any of Clauses 1 to 27, wherein a weight ratio of (1) the alkali sulfide or the alkali earth sulfide to (2) the first composition is about 1:9 to about 3:9.

Clause 29. The method of any of Clauses 1 to 28, wherein the weight ratio is about 1:5.

Clause 30. The method of any of Clauses 1 to 29, further comprising introducing a metal sulfide with the second composition.

Clause 31. The method of any of Clauses 1 to 30, further comprising introducing an admixture material with the alkali earth hydroxide particle having the metal sulfide disposed thereon to form a third composition.

Clause 32. The method of any of Clauses 1 to 31, wherein the admixture material is selected from the group consisting of an activated carbon, an alkali earth oxide, a hydrate, a carbonate, an alkali earth sulfate, a combustion derived alkali ash, and combination(s) thereof.

Clause 33. The method of any of Clauses 1 to 32, wherein introducing the admixture material with the alkali earth hydroxide particle having the metal sulfide disposed thereon is performed at a first temperature of about 150° F. (65.5° C.) or greater, wherein introducing the admixture material reduces the first temperature to a second temperature below 150° F. (65.5° C.).

Clause 34. A composition of matter, comprising:
an alkali earth hydroxide particle; and
a metal sulfide disposed on the alkali earth hydroxide particle, wherein the composition of matter has a halogen content of about 4 wt % or less.

Clause 35. The composition of matter of Clause 34, wherein the composition of matter comprises an alkali earth hydroxide particle, wherein the alkali earth hydroxide particle is calcium hydroxide.

Clause 36. The composition of matter of any of Clauses 34 to 35, wherein the metal sulfide is copper sulfide.

Clause 37. The composition of matter of any of Clauses 34 to 36, further comprising a polysulfide disposed on the alkali earth hydroxide particle.

Clause 38. The composition of matter of any of Clauses 34 to 37, wherein the polysulfide is an alkali earth polysulfide.

Clause 39. The composition of matter of any of Clauses 34 to 38, wherein the alkali earth hydroxide particle has about 5 wt % to about 20 wt % alkali earth oxide content, based on a total weight of the alkali earth hydroxide particle.

Clause 40. The composition of matter of any of Clauses 34 to 39, wherein the alkali earth hydroxide particle has about 98 wt % to about 99.9 wt % alkali earth oxide content, based on a total weight of the alkali earth hydroxide particle.

Clause 41. The composition of matter of any of Clauses 34 to 40, wherein the composition of matter has a median diameter ($D^{50}$) of about 1/8" (0.318 cm) or less, as determined by a Ro-Tap sieve lab screener or equivalent screening method familiar to those in the art.

Clause 42. The composition of matter of any of Clauses 34 to 41, wherein the composition of matter has a median diameter ($D^{50}$) of about 1/46" (0.055 cm) to about 1/9" (0.282 cm), as determined by a Ro-Tap sieve lab screener or equivalent screening method familiar to those in the art.

Clause 43. The composition of matter of any of Clauses 34 to 42, wherein the composition of matter has an alkali earth hydroxide particle content of about 60 wt % to about 90 wt %, based on a total weight of the composition of matter.

Clause 44. The composition of matter of any of Clauses 34 to 43, wherein the composition of matter has a metal sulfide content of about 3 wt % to about 20 wt %, based on a total weight of the composition of matter.

Clause 45. The composition of matter of any of Clauses 36 to 44, wherein the composition of matter has a polysulfide content of about 0.1 wt % to about 15 wt %, based on a total weight of the composition of matter.

Clause 46. The composition of matter of any of Clauses 34 to 45, wherein the alkali earth hydroxide particle has a predominantly hexagonal crystal structure, as determined by x-ray crystallography.

Clause 47. The composition of matter of any of Clauses 34 to 46, wherein the composition of matter is substantially free of an admixture material.

Clause 48. The composition of matter of any of Clauses 34 to 47, wherein the admixture material is clay.

Clause 49. The composition of matter of any of Clauses 34 to 48, wherein the admixture material is a carbon-based material.

Clause 50. A composition comprising:
the composition of matter of any of any of Clauses 34 to 49; and
an admixture material.

Clause 51. The composition of Clause 50, wherein the composition comprises:
about 1 wt % to about 50 wt % of the admixture material, based on a total weight of the composition of matter+ the admixture material, and
about 50 wt % to about 99 wt % of the composition of matter, based on a total weight of the composition of matter+the admixture material.

Clause 52. The composition of Clauses 50 or 51, wherein the admixture material is selected from the group consisting of an activated carbon, an alkali earth oxide, a hydrate, a carbonate, an alkali earth sulfate, a combustion derived alkali ash, and combination(s) thereof.

Clause 53. The composition of any of Clauses 50 to 52, wherein the admixture material is selected from the group consisting of a hydrate, a carbonate, and combination(s) thereof.

Clause 54. The composition of any of Clauses 50 to 53, wherein the admixture material has a median diameter ($D^{50}$) of about 1/8" (0.318) or less, as determined by a Ro-Tap sieve lab screener or equivalent screening method familiar to those in the art.

Clause 55. The composition of any of Clauses 50 to 54, wherein the admixture material has a median diameter ($D^{50}$) of about 1/46" (0.055 cm) to about 1/9" (0.282 cm), as determined by a Ro-Tap sieve lab screener or equivalent screening method familiar to those in the art.

Clause 56. A method for reducing an amount of a contaminant in a flue gas, the method comprising:
introducing a composition of matter with a flue gas, wherein the composition of matter comprises:
an alkali earth hydroxide particle;
a metal sulfide disposed on the alkali earth hydroxide particle; and
an optional polysulfide disposed on the particle.

Clause 57. The method of Clause 56, further comprising introducing an admixture material with the flue gas.

Clause 58. The method of Clauses 56 or 57, wherein the admixture material is selected from the group consisting of an activated carbon, an alkali earth oxide, a hydrate, a carbonate, an alkali earth sulfate, a combustion derived alkali ash, or combination(s) thereof.

Clause 59. The method of any of Clauses 56 to 58, wherein the contaminant is a mercury-containing contaminant.

Clause 60. The method of any of Clauses 57 to 59, wherein the flue gas has a temperature of about 230° F. to about 850° F., as measured at a duct.

Clause 61. The method of any of Clauses 56 to 60, wherein the flue gas has a temperature of about 275° F. to about 350° F., as measured at a duct.

Clause 62. A method for producing an alkali earth hydroxide particle having a metal sulfide disposed thereon, the method comprising:
introducing an alkali earth oxide particle with an elemental metal and elemental sulfur to form a first composition.

Clause 63. A method for producing an alkali earth hydroxide particle and disposing a metal sulfide simultaneously thereon, comprising:
introducing an alkali sulfide or an alkali earth sulfide with a metal sulfate and $H_2O$ to form a first composition; and
introducing an alkali earth oxide particle with the first composition to form a second composition.

Clause 64. A composition, comprising:
an alkali earth oxide particle; and
a metal sulfate or elemental sulfur.

Although end uses described herein relate to contaminant capture processes, it is to be understood that compositions of matter (and product compositions thereof) of the present disclosure can be used in any other suitable end use application.

Compounds of the present disclosure include tautomeric, geometric or stereoisomeric forms of the compounds. Compounds of the present disclosure can include neutral, cationic, and/or anionic forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As is apparent from the foregoing general description and the specific embodiments, while forms of the present disclosure have been illustrated and described, various modifications can be made without departing from the spirit and scope of the present disclosure. Accordingly, the present disclosure be limited thereby. Likewise whenever a composition, an element or a group of elements is preceded with the transitional phrase "comprising," it is further contemplated that the same composition or group of elements with transitional phrases "consisting essentially of," "consisting of," "selected from the group of consisting of," or "is" preceding the recitation of the composition, element, or elements and vice versa may be used.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A method for producing an alkali earth hydroxide particle and depositing a metal sulfide simultaneously thereon, comprising:
introducing an alkali sulfide or an alkali earth sulfide with a metal sulfate to form a first composition; and
introducing an alkali earth oxide particle with the first composition to form a second composition providing exothermic hydration of the alkali earth oxide particle, formation of the alkali earth hydroxide particle from the alkali earth oxide particle, deposition of the metal sulfide onto the alkali earth hydroxide particle during the alkali earth particle hydration, continuation of hydration of the alkali earth hydroxide particle after initial metal sulfide deposition, and simultaneous drying of the second composition wherein exothermic reactions, including the exothermic hydration, are sufficient to remove most free $H_2O$ from the second composition, and
wherein the alkali earth hydroxide particle has a median diameter less than a median diameter of the alkali earth oxide particle.

2. The method of claim 1, wherein the alkali earth hydroxide particle is a calcium hydroxide particle.

3. The method of claim 1, wherein the metal sulfide is a copper sulfide.

4. The method of claim 1, wherein the metal sulfate is copper sulfate.

5. The method of claim 1, wherein the metal sulfate comprises a plurality of metal sulfate particles having a median diameter of about 50 microns or less.

* * * * *